US010817668B2

(12) United States Patent
He

(10) Patent No.: US 10,817,668 B2
(45) Date of Patent: Oct. 27, 2020

(54) ADAPTIVE SEMI-SUPERVISED LEARNING FOR CROSS-DOMAIN SENTIMENT CLASSIFICATION

(71) Applicant: SAP SE, Walldorf (DE)

(72) Inventor: Ruidan He, Singapore (SG)

(73) Assignee: SAP SE, Walldorf (DE)

(*) Notice: Subject to any disclaimer, the term of this patent is extended or adjusted under 35 U.S.C. 154(b) by 127 days.

(21) Appl. No.: 16/199,422

(22) Filed: Nov. 26, 2018

(65) Prior Publication Data
US 2020/0167418 A1    May 28, 2020

(51) Int. Cl.
*G06F 40/30* (2020.01)
*G06K 9/62* (2006.01)
*G06N 3/04* (2006.01)
*G06K 9/00* (2006.01)

(52) U.S. Cl.
CPC ......... *G06F 40/30* (2020.01); *G06K 9/00442* (2013.01); *G06K 9/6215* (2013.01); *G06K 9/6267* (2013.01); *G06N 3/04* (2013.01)

(58) Field of Classification Search
CPC ....................................................... G06F 17/02
USPC .......................................... 704/1, 9, 10, 257
See application file for complete search history.

(56) References Cited

U.S. PATENT DOCUMENTS

| 9,336,776 | B2 | 5/2016 | Dahlmeier et al. |
| 2012/0209751 | A1 | 8/2012 | Chen et al. |
| 2017/0024455 | A1 | 1/2017 | Powell et al. |
| 2017/0103324 | A1 | 4/2017 | Weston et al. |
| 2017/0193098 | A1 | 7/2017 | Randhawa et al. |
| 2018/0285344 | A1 | 10/2018 | He et al. |
| 2018/0293499 | A1 | 10/2018 | He et al. |

OTHER PUBLICATIONS

He et al. "Adaptive Semi-supervised Learning for Cross-domain Sentiment Classification". Proceedings of the 2018 Conference on Empirical Methods in Natural Language Processing, pp. 3467-3476, Brussels, Belgium, Oct. 31-Nov. 4, 2018. (Year: 2018).*
Eric Tzeng, Judy Hoffman, Ning Zhang, Kate Saenko, and Trevor Darrell. 2014. Deep domain confusion: maximizing for domain invariance. In Arxiv e-prints arXiv:1412.3474. (Year: 2014).*

(Continued)

*Primary Examiner* — Jesse S Pullias
(74) *Attorney, Agent, or Firm* — Fish & Richardson P.C.

(57) ABSTRACT

Methods, systems, and computer-readable storage media for receiving a source domain data set including a set of source document and source label pairs, each source label corresponding to a source domain and indicating a sentiment attributed to a respective source document, receiving a target domain data set including a set of target documents absent target labels, processing documents of the source and target domains using a feature encoder of a DAS platform, to map the documents of the source and target domains to a shared feature space through feature representations, the processing including minimizing a distance between the feature representations of the source domain, and feature representations of the target domain based on a set of loss functions, providing an ensemble prediction from the processing, and providing predicted labels based on the ensemble prediction, the predicted labels being used by the sentiment classifier to classify documents from the target domain.

20 Claims, 4 Drawing Sheets

(56) References Cited

OTHER PUBLICATIONS

Dan Wu, Wee Sun Lee, Nan Ye, and Hai Leong Chieu. 2009. Domain adaptive bootstrapping for named entity recognition. In Conference on Empirical Methods in Natural Language Processing. (Year: 2009).*

* cited by examiner

US 10,817,668 B2

ADAPTIVE SEMI-SUPERVISED LEARNING FOR CROSS-DOMAIN SENTIMENT CLASSIFICATION

BACKGROUND

Sentiment analysis includes analyzing data generated by users (e.g., social media posts, online reviews) regarding sentiment (e.g., view of, opinions on) subjects. For example, social media sites, online forums, e-commerce websites, and the like can enable users to post reviews regarding products, services, events, persons, ideas, food, etc. Sentiment analysis seeks to process the data to provide insight into opinions of users regarding particular subjects. In some instances, sentiment analysis can include use of a sentiment classifier that classifies data based on sentiment. In some examples, a sentiment classifier can be binary (e.g., positive, negative classes). In some examples, a sentiment classifier can be n-nary (e.g., negative, somewhat negative, ambivalent, somewhat positive, positive). Sentiment classifiers are typically trained based on training data. For example, labeled training data can be used in supervised learning to train a sentiment classifier.

Sentiment classifiers are typically trained for a particular domain. For example, a sentiment classifier for restaurant reviews is trained on labeled training data that is specific to restaurants (e.g., to account for opinion words such as "tender," "tasty," or "undercooked"), while a sentiment classifier for movie reviews is trained on labeled training data that is specific to movies (e.g., to account for opinion words such as and movie reviews would contain "thrilling," "horrific," or "hilarious"). Labeling training data can be a time, and resource-intensive task. This is multiplied when considering training sentiment classifiers for each domain of multiple domains (e.g., restaurants, movies, books).

SUMMARY

Implementations of the present disclosure are directed to cross-domain sentiment analysis. More particularly, implementations of the present disclosure are directed to adaptive, semi-supervised learning for cross-domain sentiment classification.

In some implementations, actions include receiving a source domain data set including a set of source document and source label pairs, each source label corresponding to a source domain and indicating a sentiment attributed to a respective source document, receiving a target domain data set including a set of target documents absent target labels, processing documents of the source domain, and documents of the target domain, using a feature encoder of a domain adaptive semi-supervised (DAS) platform, to map the documents of the source domain and the documents of the target domain to a shared feature space through feature representations, the processing including minimizing a distance between the feature representations of the source domain, and feature representations of the target domain based on a set of loss functions, providing an ensemble prediction from the processing, and providing predicted labels based on the ensemble prediction, the predicted labels being used by the sentiment classifier to classify documents from the target domain. Other implementations of this aspect include corresponding systems, apparatus, and computer programs, configured to perform the actions of the methods, encoded on computer storage devices.

These and other implementations can each optionally include one or more of the following features: the feature encoder is provided as a one-layer convolutional neural network (CNN); the documents of the source domain, and documents of the target domain, each include user reviews; mapping the documents of the source domain and the documents of the target domain to the shared feature space is provided through feature representations of each document within the feature space; the feature representations are each domain-invariant and discriminative on both the source domain and the target domain; minimizing the distance between the feature representations of the source domain, and feature representations of the target domain is executed using maximum mean discrepancy (MMD); and each source label is provided as a one-hot vector representation of a respective sentiment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
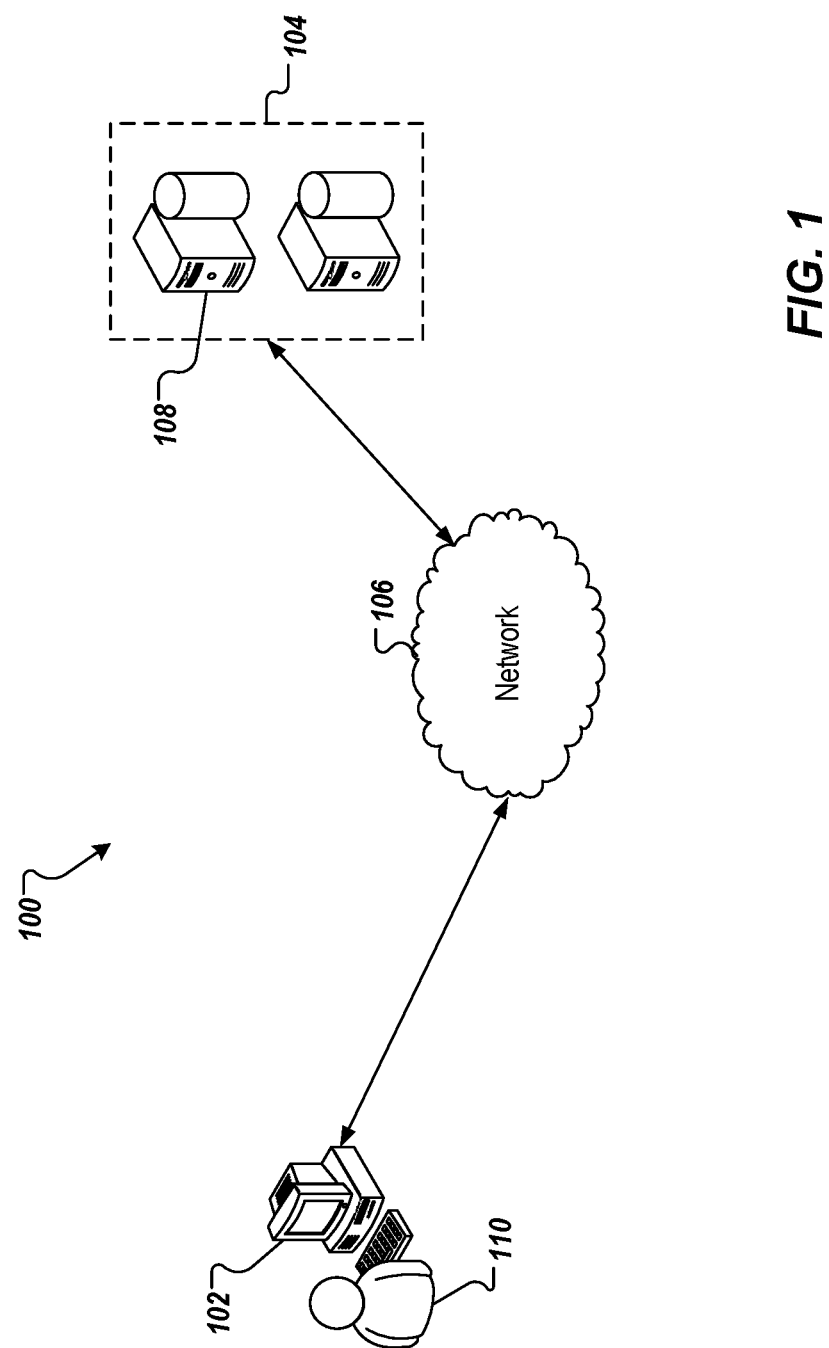
FIG. 1 depicts an example architecture that can be used to execute implementations of the present disclosure.

Implementations of the present disclosure are directed to cross-domain sentiment analysis. More particularly, implementations of the present disclosure are directed to adaptive, semi-supervised learning for cross-domain sentiment classification. Implementations can include actions of receiving a source domain data set including a set of source document and source label pairs, each source label corresponding to a source domain and indicating a sentiment attributed to a respective source document, receiving a target domain data set including a set of target documents absent target labels, processing documents of the source domain, and documents of the target domain, using a feature encoder of a domain adaptive semi-supervised (DAS) platform, to map the documents of the source domain and the documents of the target domain to a shared feature space through feature representations, the processing including minimizing a distance between the feature representations of the source domain, and feature representations of the target domain based on a set of loss functions, providing an ensemble prediction from the processing, and providing predicted labels based on the ensemble prediction, the predicted labels being used by the sentiment classifier to classify documents from the target domain.

As described in further detail herein, implementations of the present disclosure provide a DAS platform (learning framework) for training a sentiment classifier for a target domain based on data from a source domain. In some implementations, implementations of the present disclosure explicitly minimize a distance between source instances, and the target instances in an embedded feature space. With the difference between source and target minimized, implementations of the present disclosure exploit additional information from the target domain using regularizations to incorporate unlabeled target data for refinement of the sentiment classifier. Example regularizations include entropy minimization and self-ensemble bootstrapping. As compared to traditional domain adaptation approaches, the DAS platform of the present disclosure better leverage unlabeled data from the target domain, and achieves substantial improvements in performance of the sentiment classifier.

To provide further context for implementations of the present disclosure, and as introduced above, in practice, it is often difficult and costly to annotate sufficient training data for diverse application domains on-the-fly. Although sufficient labeled data may be provided for an existing domain (referred to as a source domain), there may be little to no labeled data in a new domain (referred to as a target domain). This issue has motivated research on cross-domain sentiment classification, where knowledge in the source domain is transferred to the target domain in order to alleviate the required labeling effort.

One key challenge of domain adaptation is that data in the source domain and the target domain is drawn from different distributions. Adaptation performance declines with an increase in distribution difference. Specifically, in sentiment analysis, reviews of different products have different vocabulary. For example, restaurants reviews would contain opinion words such as "tender," "tasty," or "undercooked," and movie reviews would contain "thrilling," "horrific," or "hilarious." The intersection between these two sets of opinion words could be small, if any, which makes domain adaptation difficult.

Several techniques have been proposed for addressing the problem of domain shifting. The aim is to bridge the source domain and the target domain by learning domain-invariant feature representations. In this manner, a sentiment classifier trained on a source domain can be adapted to a target domain. In cross-domain sentiment classification, several traditional approaches utilize a key intuition that domain-specific features could be aligned with the help of domain-invariant features (pivot features). For example, "hilarious" and "tasty" could be aligned as both of them are relevant to "good".

Despite their promising results, these approaches share a few significant limitations. For example, such approaches highly depend on the heuristic selection of pivot features, which may be sensitive to different applications. Consequently, the learned new representations may not effectively reduce the domain difference. Furthermore, these approaches only utilize the unlabeled target data for representation learning, while the sentiment classifier is solely trained on the source domain. There have not been many studies on exploiting unlabeled target data for refining the sentiment classifier, even though it may contain beneficial information. How to effectively leverage unlabeled target data still remains an important challenge for domain adaptation.

In view of the above context, implementations of the present disclosure provide a DAS platform that leverages the information from unlabeled target data in domain adaptation for training a sentiment classifier for a target domain. Implementations of the present disclosure are based on a view of domain adaptation being a semi-supervised learning task by considering target instances as unlabeled data, and assuming the domain distance can be effectively reduced through domain-invariant representation learning. Specifically, implementations of the present disclosure jointly perform feature adaptation and semi-supervised learning in a multi-task learning setting. For feature adaptation, the distance between the encoded representations of the source domain and the target domain is explicitly minimized. On this basis, semi-supervised regularizations are jointly employed to exploit unlabeled target data for classifier refinement.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a DAS platform that processes labeled training data for a source domain, and unlabeled training data for a target domain to provide a sentiment classifier for the target domain.

As introduced above, implementations of the present disclosure are directed to a DAS platform for adaptive, semi-supervised learning in cross-domain sentiment classification. Implementations of the present disclosure include an unsupervised domain adaptation setting, where there is no labeled data from the target domain. Two data sets $D_s$ and $D_t$ can be considered. In some examples, $D_s = \{x_i^{(s)}, y_i^{(s)}\}|_{i=1}^{n_s}$ is from the source domain with $n_s$ labeled examples, where $y_i \in \mathbb{R}^C$ is a one-hot vector representation of sentiment label, and C denotes the number of classes. In some examples, $D_t = \{x_i^{(t)}\}|_{i=1}^{n_t}$ is from the target domain with $n_t$ unlabeled examples. $N = n_s + n_t$ denotes the total number of training documents including both labeled and unlabeled. In some implementations, a sentiment classifier is learned (trained) from $D_s$ and $D_t$, such that the sentiment classifier would work well on the target domain.

Figure 2:
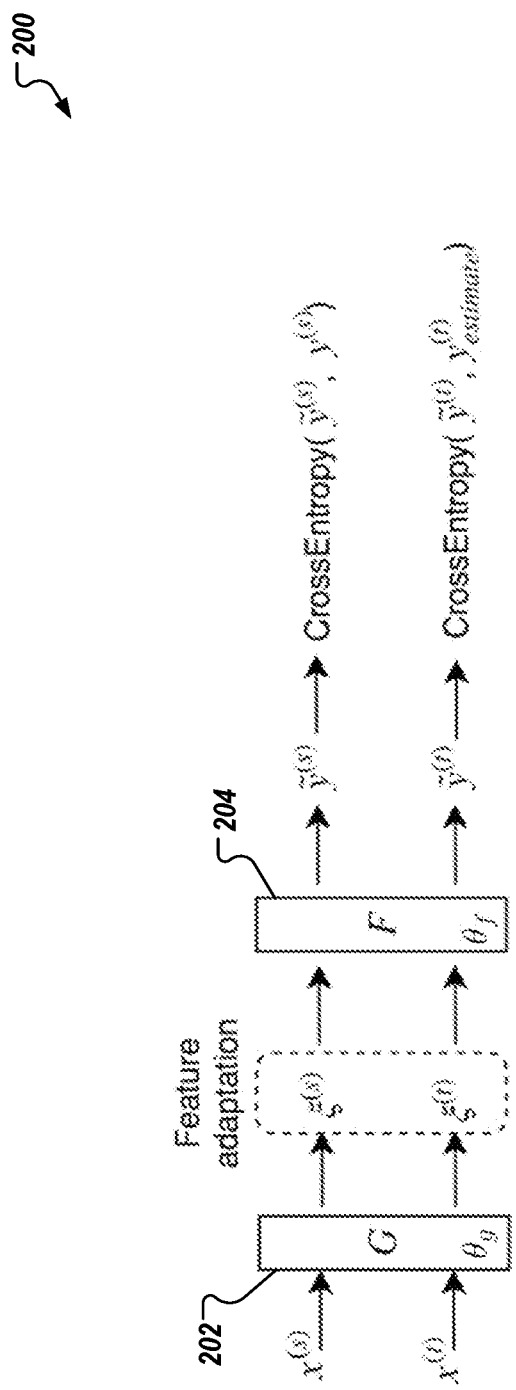
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an encoder 202, and a sentiment classifier 204. In some implementations, the encoder 202 is provided as a neural-based feature encoder that maps documents from both domains (target and shared), is denoted G, and is parameterized by $\theta_g$. By way of non-limiting example, the feature encoder G can be provided as a one-layer convolutional neural network (CNN) structure. Given a review document $x = (x_1, x_2, \ldots, x_n)$ consisting of n words, each word can be associated with a continuous word embedding $e_x$ from an embedding matrix $E \in \mathbb{R}^{V \times d}$, where V is the vocabulary size and d is the embedding dimension. E is jointly updated with other network parameters during training. Given a window of dense word embeddings $e_{x_1}, e_{x_2}, \ldots, e_{x_l}$, the convolution layer first concatenates these vectors to form a vector $\hat{x}$ of length ld. The output vector is computed as:

$$\text{Conv}(\hat{x}) = f(W \cdot \hat{x} + b) \qquad (1)$$

$\theta_g = \{W, b\}$ is the parameter set of the encoder G and is shared across all windows of the sequence, and f is an element-wise non-linear activation function. The convolution operation can capture local contextual dependencies of the input sequence, and the extracted feature vectors are similar to n-grams. After the convolution operation is applied to the whole sequence, a list of hidden vectors $H = (h_1, h_2, \ldots, h_n)$ is provided. A max-over-time pooling layer is applied to obtain the final vector representation $\xi$ of the input document.

In some implementations, the sentiment classifier 204 includes a fully connected layer with softmax activation serving, is denoted as $\mathcal{F}$ and is parameterized by $\theta_f$. Feature representations that are domain-invariant and at the same time discriminative on both domains are learned. In this manner, implementations of the present disclosure simultaneously consider three factors in the objective: (1) minimize the classification error on the labeled source examples; (2) minimize the domain discrepancy; and (3) leverage unlabeled data using semi-supervised learning.

In some implementations, encoded features of documents $\{\xi_i^{(s,t)} = G(x_i^{(s,t)}; \theta_g)\}|_{i=1}^N$ can be provided. The objective function for purpose (1) is thus the cross-entropy loss on the labeled source examples:

$$L = -\frac{1}{n_s} \sum_{i=1}^{n_s} \sum_{j=1}^{C} y_i^{(s)}(j) \log \tilde{y}_i^{(s)}(j) \qquad (1)$$

where $\tilde{y}_i^{(s)} = \mathcal{F}(\xi_i^{(s)}; \theta_f)$ denotes the predicted label distribution.

Unlike traditional approaches, implementations of the present disclosure do not attempt to align domain-specific words through pivot words. Instead, implementations of the present disclosure leverage word embeddings pre-trained on a large corpus to adequately capture this information. As introduced above, implementations of the present disclosure explicitly minimize the distance between the source and target feature representations ($\{\xi_i^{(s)}\}|_{i=1}^{n_s}$ and $\{\xi_i^{(t)}\}|_{i=1}^{n_t}$).

An example method that can be applied includes, without limitation, maximum mean discrepancy (MMD). In MMD, the distance between two distributions is estimated as the distance between sample means of the projected embeddings in Hilbert space. MMD is implicitly computed through a characteristic kernel, which is used to ensure that the sample mean is injective, leading to the MMD being zero, if and only if the distributions are identical. In implementations of the present disclosure, the mapping procedure induced by a characteristic kernel for simplifying the computation and learning is foregone. Instead, implementations of the present disclosure estimate the distribution distance as the distance between the sample means in the current embedding space. The following equations formally describe the feature adaptation loss $\mathcal{J}$:

$$\mathcal{J} = KL(g_s \| g_t) + KL(g_t \| g_s) \qquad (2)$$

$$g_s' = \frac{1}{n_s} \sum_{i=1}^{n_s} \xi_i^{(s)}, \quad g_s = \frac{g_s'}{\|g_s'\|_1} \qquad (3)$$

$$g_t' = \frac{1}{n_t} \sum_{i=1}^{n_t} \xi_i^{(t)}, \quad g_t = \frac{g_t'}{\|g_t'\|_1} \qquad (4)$$

$L_1$ normalization is applied on the mean representations $g'_s$ and $g'_t$, rescaling the vectors such that all entries sum to 1. In some examples, a symmetric version of Kullback-Leibler (KL) divergence is adopted as the distance function. Given two distribution vectors $P, Q \in \mathbb{R}^k$, $$KL(P \| Q) = \sum_{i=1}^{k} P(i) \log\left(\frac{P(i)}{Q(i)}\right).$$

As introduced above, implementations of the present disclosure seek to exploit the information in target data through semi-supervised learning objectives, which are jointly trained with L and $\mathcal{J}$. In some instances, to incorporate target data, the cross-entropy loss between the true label distributions $y_i^{(t)}$, and the predicted label distributions $\tilde{y}_i^{(t)} = \mathcal{F}(\xi_i^{(t)}; \theta_f)$ can be minimized over target samples. The challenge here is that $y_i^{(t)}$ is unknown. In view of this, implementations of the present disclosure estimate $y_i^{(t)}$ using semi-supervised learning. To achieve this, and as introduced above, regularizations of entropy minimization and self-ensemble bootstrapping are used.

With regard to entropy minimization, $y_i^{(t)}$ is estimated as the predicted label distribution $\tilde{t}_i^{(t)}$, which is a function of $\theta_g$ and $\theta_f$. The loss can be provided as:

$$\Gamma = -\frac{1}{n_t} \sum_{i=1}^{n_t} \sum_{j=1}^{C} \tilde{y}_i^{(t)}(j) \log \tilde{y}_i^{(t)}(j) \qquad (5)$$

In some examples, it is assumed that the domain discrepancy can be effectively reduced through feature adaptation, by minimizing the entropy penalty, where training of the classifier is influenced by the unlabeled target data. In some examples, the margins between the target examples and the decision boundaries are maximized to increase the prediction confidence on the target domain.

With regard to self-ensemble bootstrapping, $y_i^{(t)}$ can be estimated by estimating the unknown labels as the predictions of the model learned from the previous round of training. Bootstrapping has been explored for domain adaptation in previous approaches. However, in the previous approaches, domain discrepancy was not explicitly minimized using feature adaptation. Applying bootstrapping or other semi-supervised learning techniques in this case may worsen the results as the classifier can perform poorly on the target data.

In accordance with implementations of the present disclosure, $y_i^{(t)}$ is estimated by forming ensemble predictions of labels during training, using the outputs on different training epochs. The loss is formulated as follows:

$$\Omega = -\frac{1}{N}\sum_{i=1}^{N}\sum_{j=1}^{C} \tilde{z}_i^{(s,t)}(j)\log \tilde{y}_i^{(s,t)}(j) \quad (6)$$

where $\tilde{z}$ denotes the estimated labels computed on the ensemble predictions from different epochs. The loss is applied on all documents, and serves for bootstrapping on the unlabeled target data. The loss also serves as a regularization that encourages the network predictions to be consistent in different training epochs. $\Omega$ is jointly trained with L, $\mathcal{J}$, and $\Gamma$. The following example algorithm depicts the overall training process of the DAS platform:

---
Listing 1: Example Pseudo-code for Training DAS
---
Require $D_s$, $D_t$, G, $\mathcal{F}$
Require $\alpha$ = ensembling momentum, $0 \leq \alpha < 1$
Require w(t) = weight ramp-up function
    $Z \leftarrow 0_{[N \times C]}$
    $\tilde{z} \leftarrow 0_{[N \times C]}$
    for t ∈ [1, max − epochs] do
        for each minibatch $B^{(s)}$, $B^{(t)}$, $B^{(u)}$, in $D_s$, $D_t$, $\{x_i^{(s,t)}\}|_{i=1}^{N}$ do
            compute loss L on $[x_{i \in B^{(s)}}, y_{i \in B^{(s)}}]$
            compute loss$^{\mathcal{J}}$ on $[x_{i \in B^{(s)}}, x_{i \in B^{(t)}}]$
            compute loss $\Gamma$ on $x_{i \in B^{(t)}}$
            compute loss $\Omega$ on $[x_{i \in B^{(u)}}, \tilde{z}_{i \in B^{(u)}}]$
            overall − loss ← L + $\lambda_1 \mathcal{J}$ + $\lambda_2 \Gamma$ + w(t)$\Omega$
            update network parameters
        end for
        $Z'_i \leftarrow \mathcal{F}(G(x_i))$, for i ∈ N
        $z \leftarrow \alpha z + (1 − \alpha)Z'$
        $\tilde{z} \leftarrow$ one − hot − vectors(Z)
    end for In the example of Listing 1, $\lambda_1$, $\lambda_2$, $\lambda_2$, and w(t) are weights to balance the effects of $\mathcal{J}$, $\Gamma$, and $\Omega$ respectively. $\lambda_1$ and $\lambda_2$ are constant hyper-parameters. In some examples, w(t) is set as a Gaussian curve to ramp up the weight from 0 to $\lambda_3$. For example:

$$w(t) = \exp\left[-5\left(1 - \frac{t}{\max - epochs}\right)^2\right]\lambda_3 \quad (7)$$

This is to ensure the ramp-up of the bootstrapping loss component is slow enough in the beginning of the training. After each training epoch, $Z'_i$ is computed, which denotes the predictions made by the network in the current epoch, and the ensemble prediction $Z_i$ is updated as a weighted average of the outputs from previous epochs and the current epoch, with recent epochs having larger weight. For generating estimated labels $\tilde{z}_i$, $Z_i$ is converted to a one-hot vector, where the entry with the maximum value is set to one and other entries are set to zeros. The ensemble prediction is likely to be closer to the correct, unknown labels of the target data.

Figure 3:
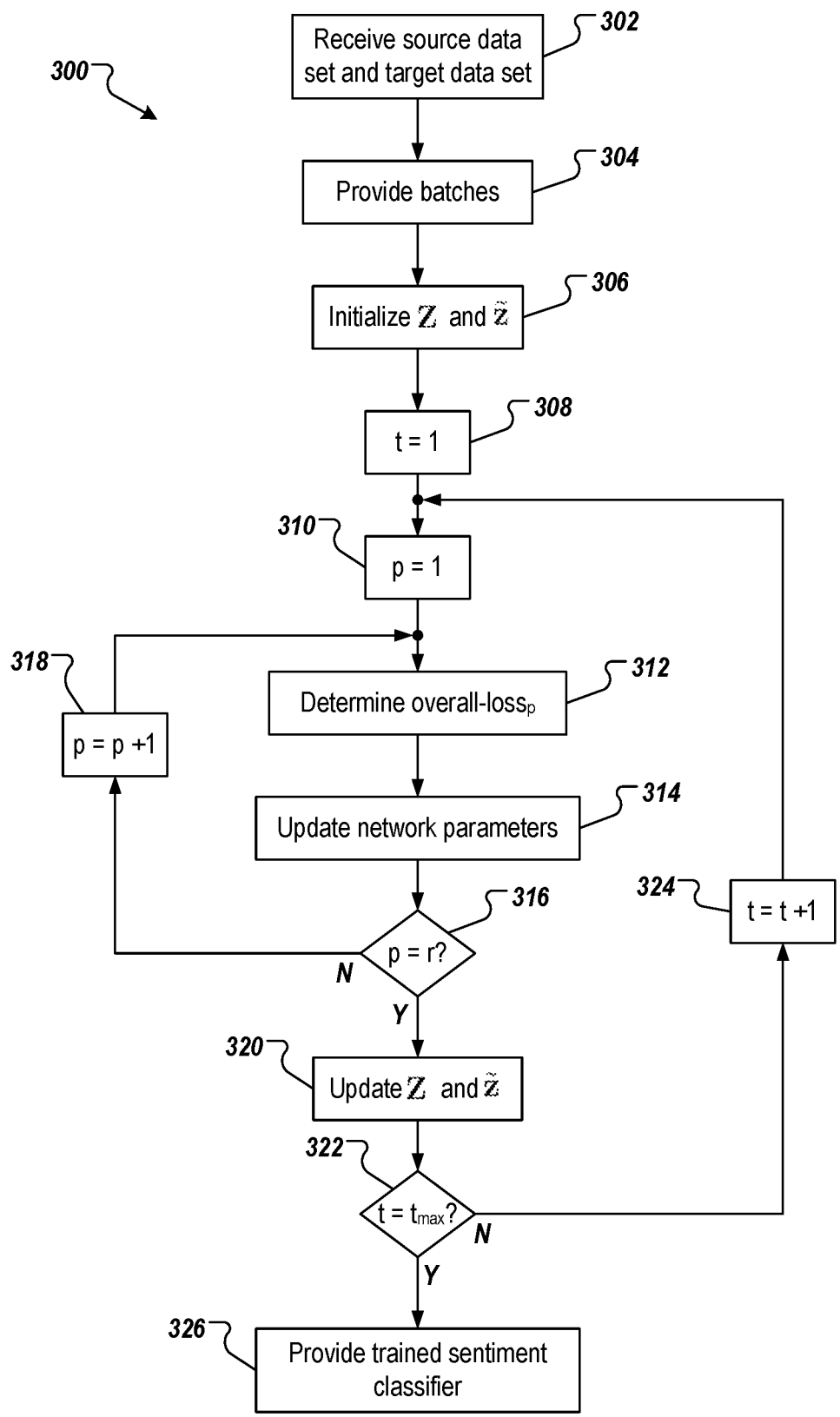
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A source data set, and a target data set are received (302).

Two or more batches are provided (304). In some examples, r batches are provided from each of the source data set, and the second data set (e.g., $B^{(s)}$, $B^{(t)}$, $B^{(u)}$ of Listing 1). As described in detail herein, the batches are processed within each training epoch t of a set of training epochs $t_{max}$ (referred to as max—epochs in Listing 1, and Equation 7). Ensemble predictions Z and estimated labels $\tilde{z}$ are initialized (306). For example, $Z \leftarrow 0_{[N \times C]}$ and $\tilde{z} \leftarrow 0_{[N \times C]}$, where N is the total number of training documents (both labeled and unlabeled), and C is the number of classes. A counter t is set equal to 1 (308), and a counter p is set equal to 1 (310).

Training of the network is performed using a batch p, and an overall loss for the batch p (overall—loss$_p$) is determined (313). For example, and as described herein, the overall loss is determined as: overall—loss←L+$\lambda_1 \mathcal{J}$ +$\lambda_2\Gamma$+w(t)$\Omega$. Parameters of the network are updated based on the overall loss. It is determined whether p is equal to r (316). That is, it is determined whether all batches have been processed for the current epoch t. If all batches have not been processed, the counter p is incremented (318), and the example process 300 loops back to process the next batch for the current epoch.

If all batches have been processed, the ensemble predictions Z, and the estimated labels $\tilde{z}$ are updated based on the results of the current epoch t (320). In some examples, the ensemble predictions Z are updated as a weighted average of the outputs from previous epochs and the current epoch, with recent epochs having larger weight. As described herein, the estimated labels $\tilde{z}_i$ are provided by converting $Z_i$ to a one-hot vector, where the entry with the maximum value is set to one and other entries are set to zeros. For example, $\tilde{z} \leftarrow$ one—hot—vectors(Z). It is determined whether the current epoch t is equal to $t_{max}$ (322). That is, it is determined whether all training epochs have been executed. If t is not equal to $t_{max}$, t is incremented (324), and the example process 300 loops back to execute the next epoch. If t is equal to $t_{max}$, training is complete, and the target domain sentiment classifier is provided (326). That is, the target domain sentiment classifier is made available for use to process documents from the target domain, and classify each document.

Figure 4:
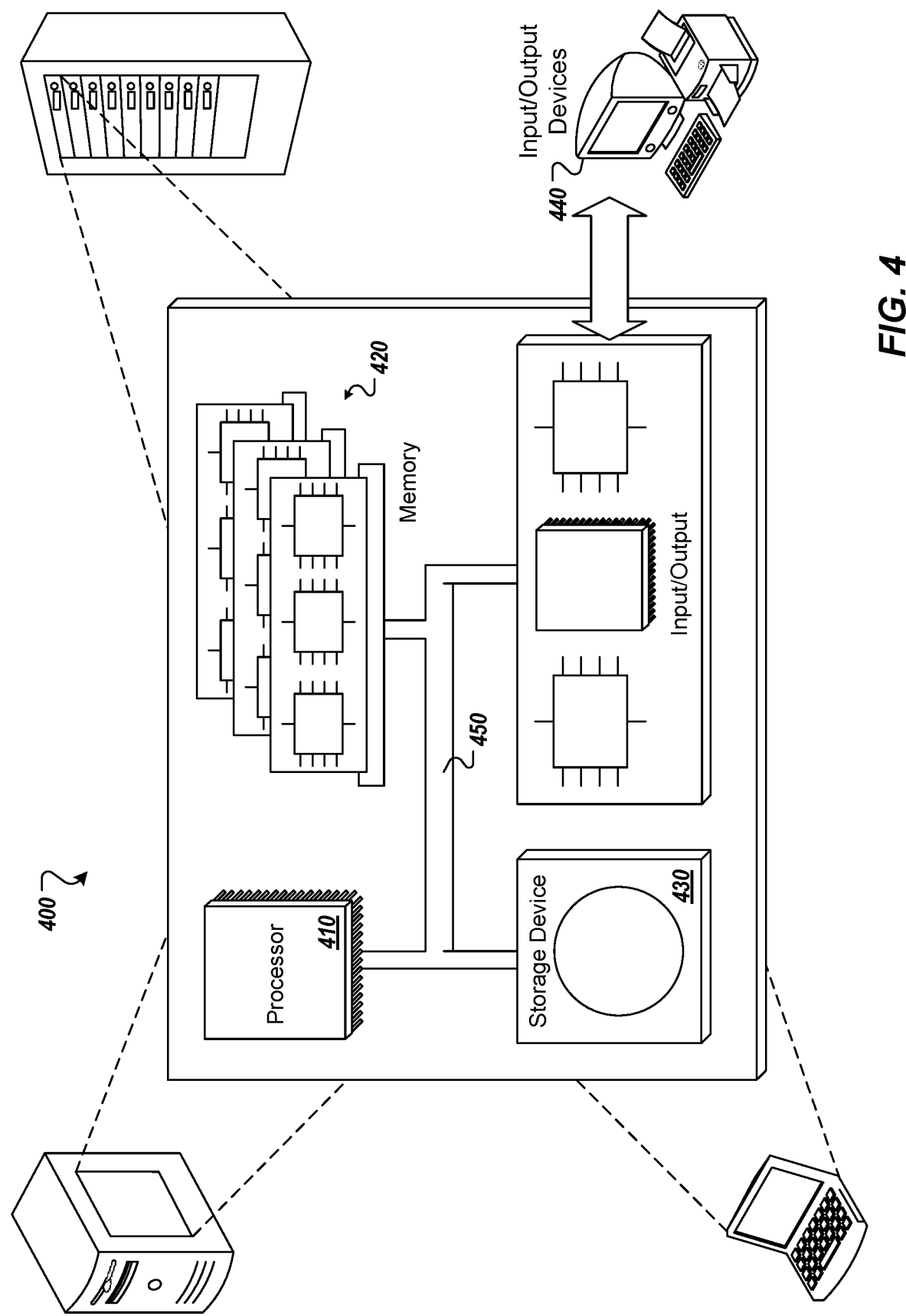
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for providing a sentiment classifier, the method being executed by one or more processors and comprising:
   receiving a source domain data set comprising a set of source document and source label pairs, each source label corresponding to a source domain and indicating a sentiment attributed to a respective source document;
   receiving a target domain data set comprising a set of target documents absent target labels;
   processing documents of the source domain, and documents of the target domain, using a feature encoder of a domain adaptive semi-supervised (DAS) platform, to map the documents of the source domain and the documents of the target domain to a shared feature space through feature representations, the processing comprising minimizing a distance between the feature representations of the source domain, and feature representations of the target domain based on a set of loss functions;
   providing an ensemble prediction from the processing; and
   providing predicted labels based on the ensemble prediction, the predicted labels being used by the sentiment classifier to classify documents from the target domain.

2. The method of claim 1, wherein the feature encoder is provided as a one-layer convolutional neural network (CNN).

3. The method of claim 1, wherein the documents of the source domain, and documents of the target domain, each comprise user reviews.

4. The method of claim 1, wherein mapping the documents of the source domain and the documents of the target domain to the shared feature space is provided through feature representations of each document within the feature space.

5. The method of claim 4, wherein the feature representations are each domain-invariant and discriminative on both the source domain and the target domain.

6. The method of claim 1, wherein minimizing the distance between the feature representations of the source domain, and feature representations of the target domain is executed using maximum mean discrepancy (MMD).

7. The method of claim 1, wherein each source label is provided as a one-hot vector representation of a respective sentiment.

8. A non-transitory computer-readable storage medium coupled to one or more processors and having instructions stored thereon which, when executed by the one or more processors, cause the one or more processors to perform operations for providing a sentiment classifier, the operations comprising:
receiving a source domain data set comprising a set of source document and source label pairs, each source label corresponding to a source domain and indicating a sentiment attributed to a respective source document;
receiving a target domain data set comprising a set of target documents absent target labels;
processing documents of the source domain, and documents of the target domain, using a feature encoder of a domain adaptive semi-supervised (DAS) platform, to map the documents of the source domain and the documents of the target domain to a shared feature space through feature representations, the processing comprising minimizing a distance between the feature representations of the source domain, and feature representations of the target domain based on a set of loss functions;
providing an ensemble prediction from the processing; and
providing predicted labels based on the ensemble prediction, the predicted labels being used by the sentiment classifier to classify documents from the target domain.

9. The computer-readable storage medium of claim 8, wherein the feature encoder is provided as a one-layer convolutional neural network (CNN).

10. The computer-readable storage medium of claim 8, wherein the documents of the source domain, and documents of the target domain, each comprise user reviews.

11. The computer-readable storage medium of claim 8, wherein mapping the documents of the source domain and the documents of the target domain to the shared feature space is provided through feature representations of each document within the feature space.

12. The computer-readable storage medium of claim 11, wherein the feature representations are each domain-invariant and discriminative on both the source domain and the target domain.

13. The computer-readable storage medium of claim 8, wherein minimizing the distance between the feature representations of the source domain, and feature representations of the target domain is executed using maximum mean discrepancy (MMD).

14. The computer-readable storage medium of claim 8, wherein each source label is provided as a one-hot vector representation of a respective sentiment.

15. A system, comprising:
a computing device; and
a computer-readable storage device coupled to the computing device and having instructions stored thereon which, when executed by the computing device, cause the computing device to perform operations for providing a sentiment classifier, the operations comprising:
receiving a source domain data set comprising a set of source document and source label pairs, each source label corresponding to a source domain and indicating a sentiment attributed to a respective source document,
receiving a target domain data set comprising a set of target documents absent target labels,
processing documents of the source domain, and documents of the target domain, using a feature encoder of a domain adaptive semi-supervised (DAS) platform, to map the documents of the source domain and the documents of the target domain to a shared feature space through feature representations, the processing comprising minimizing a distance between the feature representations of the source domain, and feature representations of the target domain based on a set of loss functions,
providing an ensemble prediction from the processing, and
providing predicted labels based on the ensemble prediction, the predicted labels being used by the sentiment classifier to classify documents from the target domain.

16. The system of claim 15, wherein the feature encoder is provided as a one-layer convolutional neural network (CNN).

17. The system of claim 15, wherein the documents of the source domain, and documents of the target domain, each comprise user reviews.

18. The system of claim 15, wherein mapping the documents of the source domain and the documents of the target domain to the shared feature space is provided through feature representations of each document within the feature space.

19. The system of claim 18, wherein the feature representations are each domain-invariant and discriminative on both the source domain and the target domain.

20. The system of claim 15, wherein minimizing the distance between the feature representations of the source domain, and feature representations of the target domain is executed using maximum mean discrepancy (MMD).

* * * * *